(12) United States Patent
Yamada et al.

(10) Patent No.: US 9,587,796 B2
(45) Date of Patent: Mar. 7, 2017

(54) VEHICLE LAMP

(71) Applicant: KOITO MANUFACTURING CO., LTD., Tokyo (JP)

(72) Inventors: Kenji Yamada, Shizuoka (JP); Shinichiro Takahashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 242 days.

(21) Appl. No.: 14/221,962

(22) Filed: Mar. 21, 2014

(65) Prior Publication Data

US 2014/0286034 A1 Sep. 25, 2014

(30) Foreign Application Priority Data

Mar. 21, 2013 (JP) ................. 2013-058364

(51) Int. Cl.
*F21V 7/00* (2006.01)
*F21S 8/10* (2006.01)
*B60Q 1/26* (2006.01)
*B60Q 1/00* (2006.01)

(52) U.S. Cl.
CPC ........... *F21S 48/23* (2013.01); *B60Q 1/0041* (2013.01); *B60Q 1/2607* (2013.01); *F21S 48/211* (2013.01); *F21S 48/217* (2013.01); *F21S 48/218* (2013.01); *F21S 48/238* (2013.01); *B60Q 2400/10* (2013.01)

(58) Field of Classification Search
CPC ... B60Q 2400/10; F21S 48/211; F21S 48/217; F21S 48/23
USPC .................................. 362/516, 518
See application file for complete search history.

(56) References Cited

U.S. PATENT DOCUMENTS

| | | | | |
|---|---|---|---|---|
| 7,658,528 B2* | 2/2010 | Hoelen | ...................... | F21V 5/04 359/665 |
| 7,963,664 B2* | 6/2011 | Bertram | .................... | F21K 9/00 362/231 |
| 8,922,113 B2* | 12/2014 | Forrest | ................... | H05B 33/10 313/504 |
| 2001/0053082 A1* | 12/2001 | Chipalkatti | .............. | B60Q 1/26 362/496 |
| 2004/0156211 A1* | 8/2004 | Blusseau | .............. | F21S 48/1159 362/545 |
| 2006/0077683 A1* | 4/2006 | Muller | ................. | B60Q 1/0052 362/544 |

(Continued)

FOREIGN PATENT DOCUMENTS

| | | |
|---|---|---|
| EP | 0772378 A2 | 5/1997 |
| EP | 1371901 A2 | 12/2003 |

(Continued)

OTHER PUBLICATIONS

Extended European Search Report issued in corresonding European Application No. 14160942.0, mailed on May 8, 2015 (8 pages).

*Primary Examiner* — Peggy Neils
*Assistant Examiner* — Tsion Tumebo
(74) *Attorney, Agent, or Firm* — Osha Liang LLP

(57) ABSTRACT

A vehicle lamp includes a light source and an optical member that reflects light from the light source. The light source includes a base extending in a front-rear direction of the vehicle lamp, and a surface light-emitting device provided on the base. The surface light-emitting device is structured to project a pattern on the optical member.

10 Claims, 7 Drawing Sheets

(56) References Cited

U.S. PATENT DOCUMENTS

2008/0007936 A1\* 1/2008 Liu ........................ F21S 10/02
362/84

FOREIGN PATENT DOCUMENTS

| EP | 2295849 A1 | 3/2011 |
|----|------------|--------|
| EP | 2738449 A1 | 6/2014 |
| JP | 2002-008413 A | 1/2002 |
| JP | 2006-196196 A | 7/2006 |
| JP | 2008-059901 A | 3/2008 |
| JP | 2011-150887 A | 8/2011 |
| WO | 2011-098430 A1 | 8/2011 |
| WO | 2011-107904 A1 | 9/2011 |

\* cited by examiner

US 9,587,796 B2

VEHICLE LAMP

CROSS-REFERENCE TO RELATED APPLICATIONS

The present application claims priority from Japanese Patent Application No. 2013-058364 filed on Mar. 21, 2013, the entire content of which is incorporated herein by reference.

BACKGROUND OF INVENTION

Field of the Invention

The present invention relates to a vehicle lamp and, more particularly, to a vehicle lamp having a light source with a surface light-emitting device.

Related Art

In recent years, there are increasing needs for vehicle lamps having unconventional and novel appearances in view of users' diversifying preferences. For example, a related art vehicle lamp is configured such that an optical member reflecting light from a light source gives a radially light-emitting appearance (see, e.g., JP 2008-059901A).

However, this vehicle lamp has a relatively complex configuration. For example, some portions of the reflector are configured to totally reflect the light from the light source and other portions of the reflector are configured to transmit the light from the light source. Further, the lamp requires a number of components, including multiple reflectors and sometimes multiple light sources, resulting in an increase in manufacturing cost.

SUMMARY OF INVENTION

One or more embodiments of the present invention provides a vehicle lamp having a desired light-emitting appearance at low cost.

According to one or more embodiments of the present invention, a vehicle lamp is provided. The vehicle lamp includes a light source and an optical member configured to reflect light from the light source. The light source includes a base extending in a front-rear direction of the vehicle lamp and a surface light-emitting device provided on the base. The surface light-emitting device is configured and arranged to project a pattern on the optical member.

That is, the light emitted by the surface light-emitting device and reflected by the optical member gives a patterned appearance.

Embodiments of the present invention include a combination of some of the elements described above and a corresponding method.

BRIEF DESCRIPTION OF DRAWINGS

FIG. 4 is a diagram illustrating a pattern projected on a reflector when the light source is turned on;

FIG. 7 is a diagram illustrating a pattern projected on a reflector when the light source of FIG. 6 is turned on.

DETAILED DESCRIPTION

Figure 1:
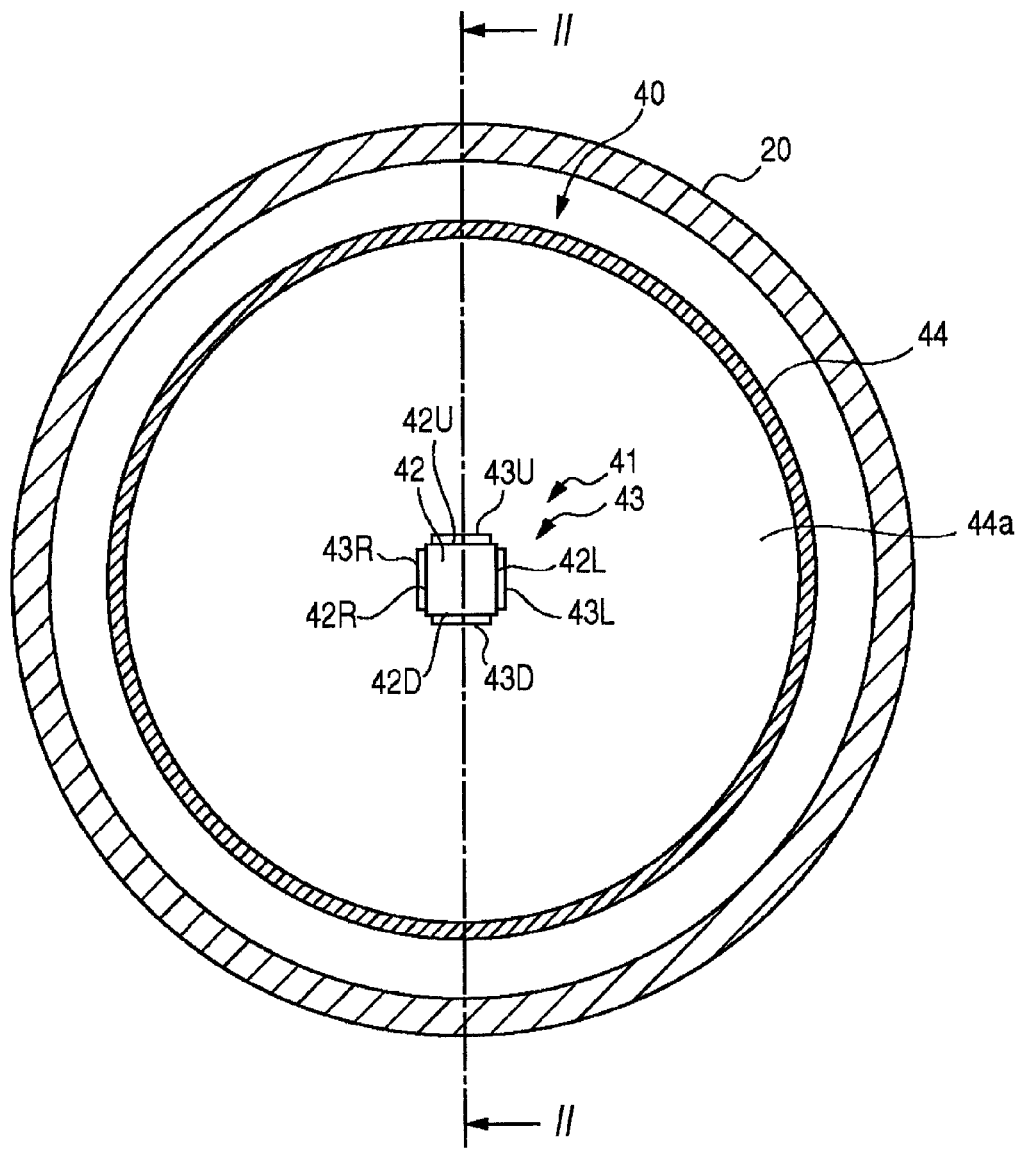
FIG. 1 is a front view illustrating a vehicle lamp according to one ore more embodiments of the present invention.

Hereinafter, embodiments of the present invention will be described with reference to the drawings. The same or similar elements are denoted by the same reference signs, and repetitive description thereof will be omitted as appropriate. In the drawings, dimensions of the elements are enlarged or reduced as appropriate for ease of understanding. Further, some elements that are not used in describing embodiments are omitted in the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
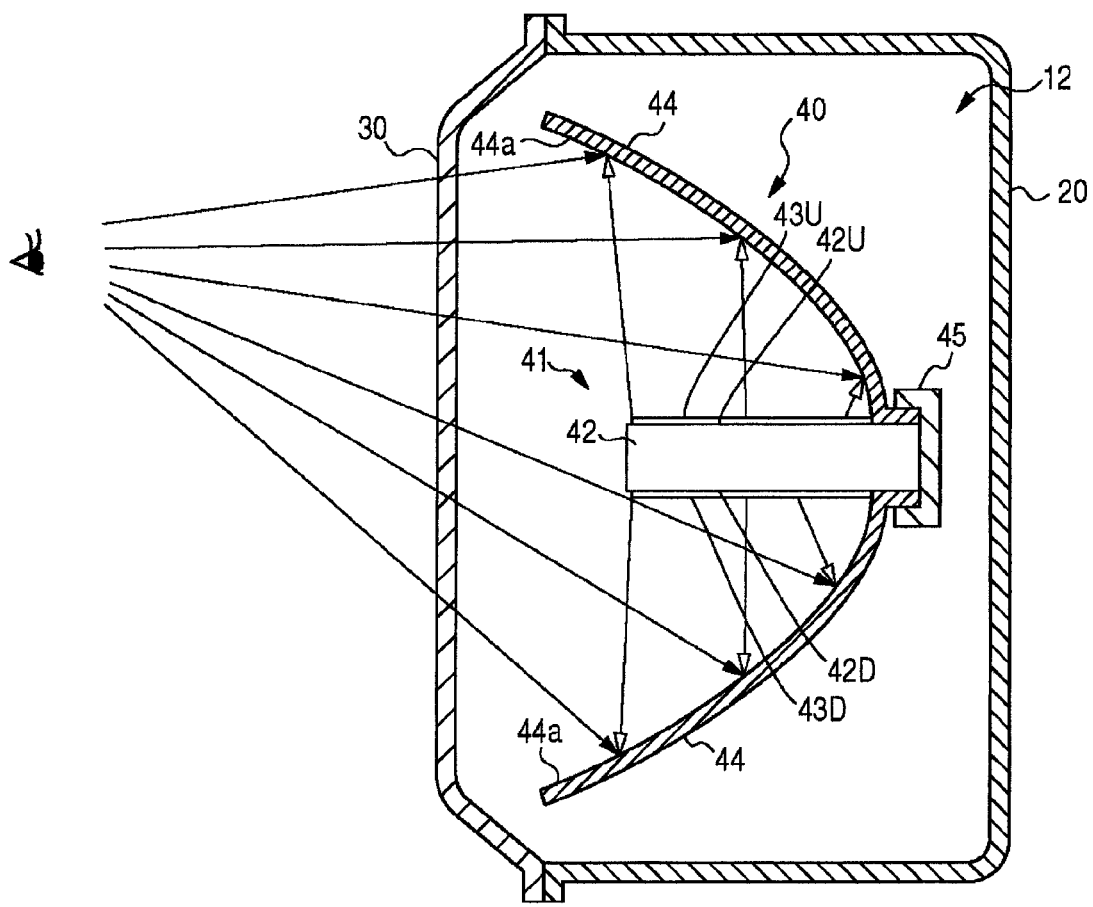
FIG. 2 is a sectional view of the vehicle lamp, taken along the line II-II of FIG. 1.
Figure 3:
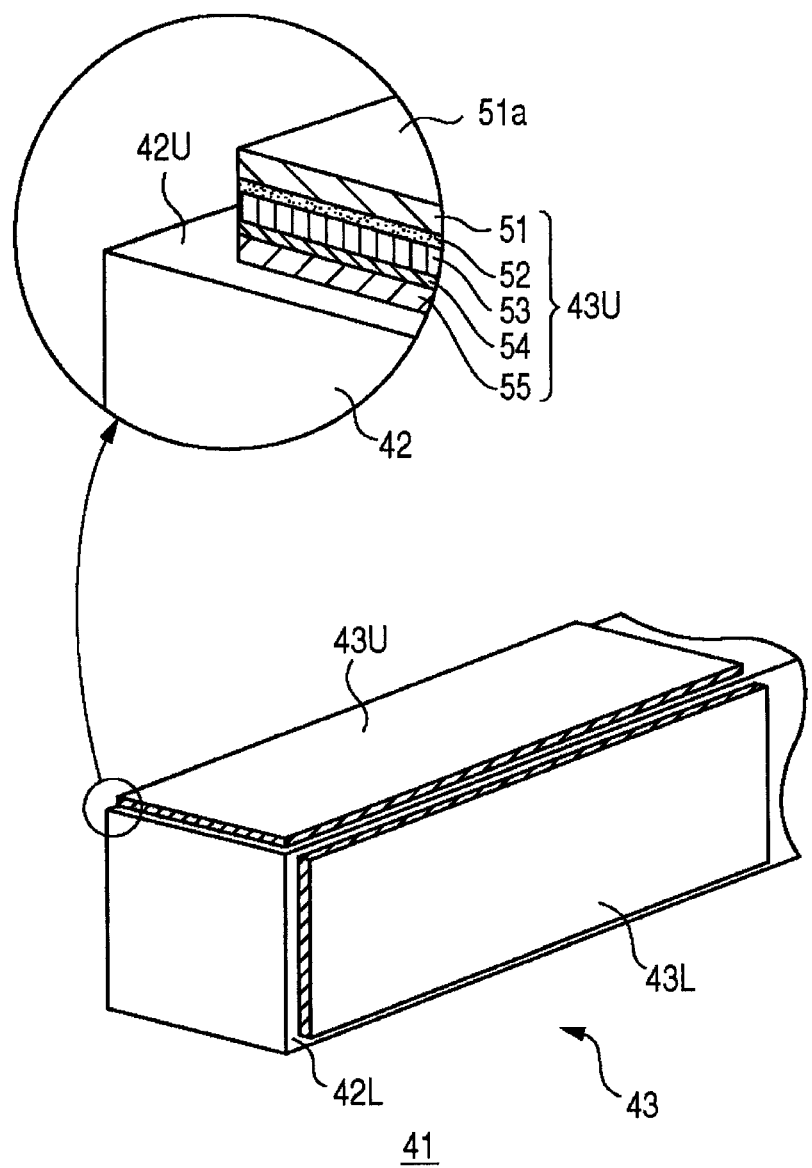
FIG. 3 is a perspective view of a light source of FIG. 2.

FIG. 1 is a front view showing a vehicle lamp 100 according to one ore more embodiments of the present invention. FIG. 2 is a sectional view of the vehicle lamp 100, taken along the line II-II of FIG. 1. FIG. 3 is a perspective view illustrating a light source 41. The vehicle lamp 100 includes a lamp body 20, a transparent cover 30 and a lamp unit 40. In FIG. 1, the transparent cover 30 is removed to better illustrate an internal configuration of the vehicle lamp 100.

In the following description, a side on which the transparent cover 30 is arranged is defined as a front side and a side on which the lamp body 20 is defined as a rear side. Further, a right side and a left side are defined with a view in a direction toward the front of the lamp.

The lamp body 20 is formed in a shape like a box having an opening. The transparent cover 30 is has a shape like a bowl and is made of transparent resin or glass. The transparent cover 30 is attached to the opening portion of the lamp body 20. A lamp chamber 12 is formed by the lamp body 20 and the transparent cover 30. The lamp unit 40 is accommodated inside the lamp chamber 12. The lamp unit 40 includes the light source 41, a reflector 44 and a support member 45 supporting the light source 41 and the reflector 44.

The light source 41 includes a base 42 and surface light-emitting devices 43U, 43D, 43L, 43R (hereinafter, "surface light-emitting device 43" when these light-emitting elements are collectively referred or are not particularly distinguished). The base 42 has a substantially rectangular column shape and is arranged to extend substantially in alignment with the front-rear direction of the lamp. The base 42 is made of, for example, glass or resin such as acrylic or polycarbonate.

The surface light-emitting device 43U is firmly attached to an upper side surface 42U of the base 42, the surface light-emitting device 43D is firmly attached to a lower side surface 42D of the base 42, the surface light-emitting device 43L is firmly attached to a left side surface 42L of the base 42 and the surface light-emitting device 43R is firmly attached to a right side surface 42R of the base 42. Each surface light-emitting device 43 is an organic electro-luminescence (EL) device, and is configured in a form of a sheet having a substantially rectangular surface. More specifically, the surface light-emitting device 43 is formed to have a size and shape that covers a side surface of the base 42 excluding an edge portion of the base 42. Because the organic EL device can be easily processed to have an optional shape, the surface light-emitting device 43 can be formed to have a desired shape.

Each surface light-emitting device 43 includes a first substrate 51, a transparent electrode 52, an organic light-emitting layer 53, a back electrode 54, and a second substrate 55. While a configuration of only the surface light-emitting device 43U is shown in FIG. 3, other surface light-emitting devices 43D, 43L, 43R may have the same configuration as the surface light-emitting device 43U. The first substrate 51 is a transparent member made of, for example, glass or the like. The transparent electrode 52 is made of, for example, transparent electrically-conductive material such as indium tin oxide (ITO). The organic light-emitting layer 53 is configured to emit light, in this embodiment, red light. That is, in this embodiment, four surface light-emitting devices 43 are configured to emit red light. The back electrode 54 is made of metallic material such as aluminum or magnesium. The second substrate 55 is made of, for example, glass, metal plate or the like.

When voltage is applied between the transparent electrode 52 and the back electrode 54, holes are injected into the organic light-emitting layer 53 from the transparent electrode 52 and electrons are injected into the organic light-emitting layer 53 from the back electrode 54, so that the holes and the electrons are coupled to each other in the organic light-emitting layer 53 to emit light. The organic light-emitting layer 53 emits the light toward the outside of the surface light-emitting device 43 through the transparent electrode 52 and the first substrate 51. In this way, the surface light-emitting device 43 is configured provide surface light-emission from the surface 51a of the first substrate 51.

The reflector 44 has a curved reflecting surface 44a, and is arranged such that the center axis of the reflecting surface 44a passes through the light source 41. According to one or more embodiments of the present invention, the reflector 44 is arranged such that the center axis of the reflecting surface 44a is substantially aligned with the center axis of the base 42. With this reflecting surface 44a, the light from the four surface light-emitting devices 43 is reflected toward the front of the lamp.

Figure 4:
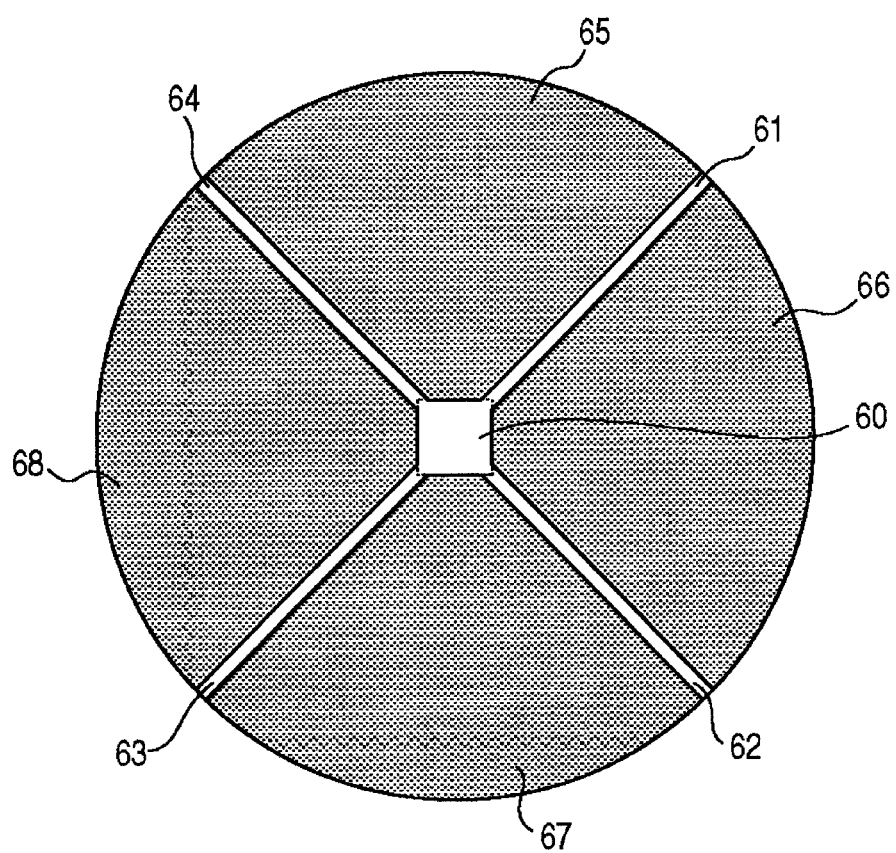

FIG. 4 illustrates a pattern projected on the reflector 44 when the light source 41 is turned on. More specifically, FIG. 4 illustrates a pattern that is observed through the transparent cover 30 from a position in front of the lamp, for example, from a position 1 m in front of the lamp. In FIG. 4, hatched regions indicate regions that provide a red light emitting appearance. That is, the hatched regions are the regions where the light from the light source 41 reaches the reflector 44 and is reflected by the reflector 44 to give a red light emitting appearance. Non-hatched regions indicate regions on which the light is not projected and provide a dark appearance. As shown in FIG. 4, a region 60 corresponding to an end surface of the light source 41 and regions 61, 62, 63 64 corresponding to portions of the side surfaces of the light source 41 that are not covered by the surface light-emitting devices 43 are the regions on which the light is not projected and give a dark appearance. On the other hand, a region 65 gives a red light-emitting appearance by the reflection of the light from the surface light-emitting device 43U. Similarly, a region 66 gives a red light-emitting appearance by the reflection of the light from the surface light-emitting device 43L, a region 67 gives a red light-emitting appearance by the reflection of the light from the surface light-emitting device 43D, and a region 68 gives a red light-emitting appearance by the reflection of the light from the surface light-emitting device 43R. The resulting pattern includes four sector shaped regions 65, 66, 67, 68 arranged in a circumferential direction, each giving a red light-emitting appearance. That is, a patterned light-emitting appearance is achieved by a contrast of the light. This type of lamp having a red light-emitting appearance may be used as, for example, a tail lamp.

According to the vehicle lamp 100 described above, it is possible to present a desired pattern in accordance with the contrast of light by using surface light-emitting devices 43 that can be easily processed to have an optional shape.

In one or more of the embodiments described above, the reflector 44 is described as an optical member having a function of only reflecting light from the light source 41. However, the reflector may be configured to have, in addition to the light reflecting function, a function as a light source.

Figure 5:
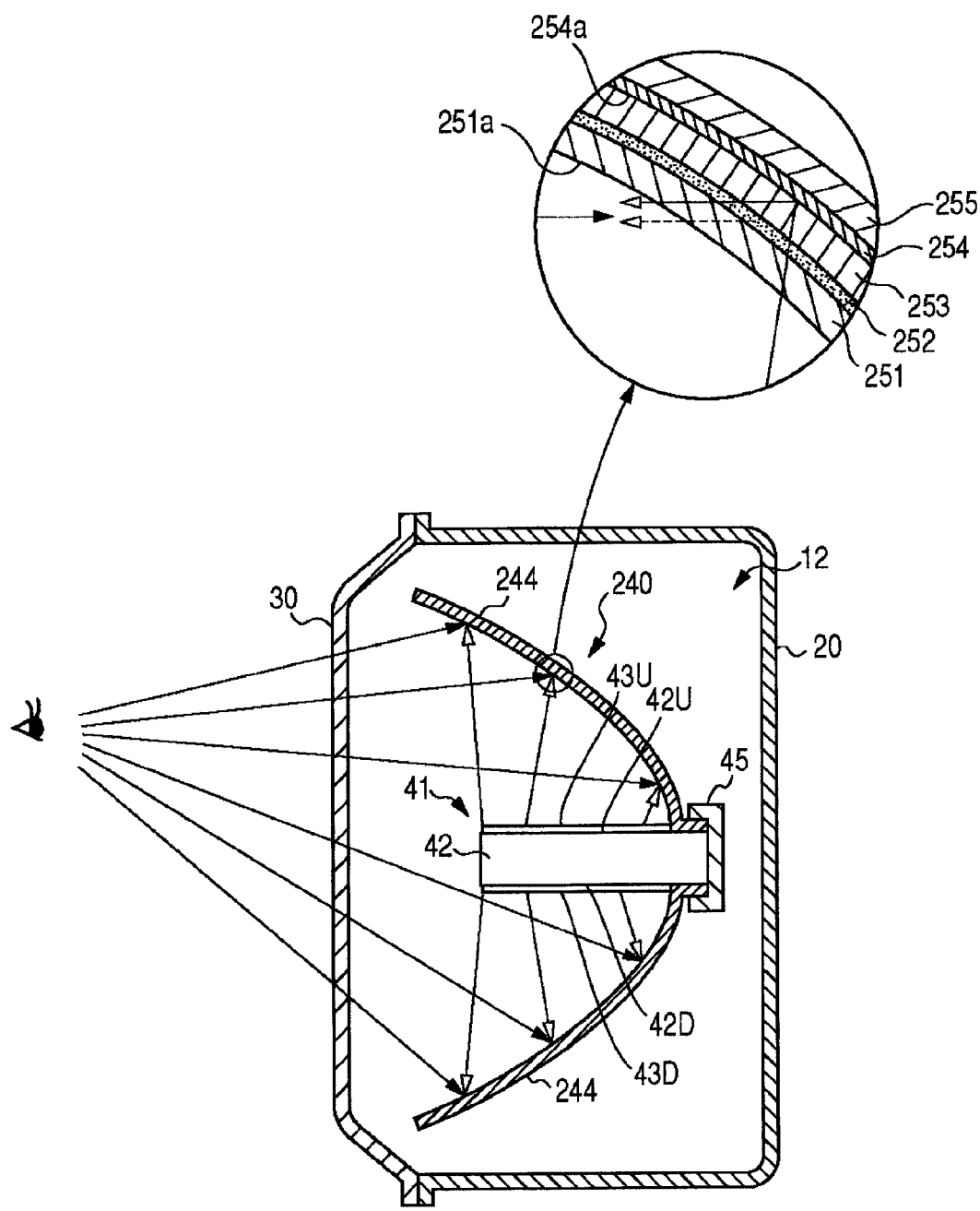
FIG. 5 is a sectional view illustrating a vehicle lamp according to one ore more embodiments of the present invention.

FIG. 5 is a sectional view of a vehicle lamp 200 according to one or more embodiments of the present invention. FIG. 5 corresponds to FIG. 2. The vehicle lamp 200 includes the lamp body 20, the transparent cover 30 and a lamp unit 240. The lamp unit 240 includes the light source 41, a reflector 244, and the support member 45.

The reflector 244 includes a first substrate 251, a transparent electrode 252, an organic light-emitting layer 253, a back electrode 254 and, a second substrate 255. They are similar to the first substrate 51, the transparent electrode 52, the organic light-emitting layer 53, the back electrode 54, and the second substrate 55 of the surface light-emitting device 43 of the light source 41, respectively.

The reflector 244 reflects the light from the light source 41 toward the front of the lamp. Specifically, the light from the light source 41 enters the reflector 244 from a surface 251a of the first substrate 251 on a side facing the light source 41. The entered light is transmitted through the first substrate 251, the transparent electrode 252 and the organic light-emitting layer 253 and is reflected toward the front of the lamp at a surface 254a of the back electrode 254 on a side facing the light source 41. That is, the surface 254a of the back electrode 254 has a curved shape and serves as a reflecting surface.

Like the surface light-emitting device 43, the organic light-emitting layer 253 emits light when voltage is applied between the transparent electrode 252 and the back electrode 254 of the reflector 244. That is, the reflector 244 includes a surface light-emitting and reflecting device having a reflecting surface and configured to provide a surface light-emission. In this way, the reflector 244 has, in addition to the function as a reflecting member for reflecting the light from the light source 41, a function as a light source for emitting light by itself. The light from the light source 41 and reflected by the reflector 244 is mixed with the light emitted by the reflector 244, and is sent toward the front of the lamp.

The vehicle lamp 200 provides similar advantageous effects as the vehicle lamp 100. In addition, according to the vehicle lamp 200, the light from the light source 41 and reflected by the reflector 244 is mixed with the light emitted by the reflector 244 itself, and is sent toward the front of the lamp. Therefore, for example, in a case in which the light source 41 and the reflector 244 are both configured to emit red light, it is possible to selectively produce red light having a relatively low luminous intensity or red light having a relatively high luminous intensity. Specifically, the red light having the relatively low luminous intensity is produced when one of the light source 41 and the reflector 244 is caused to emit light, and the red light having the relatively high luminous intensity is produced when both of the light source 41 and the reflector 244 are caused to emit light. Accordingly, it is possible to provide a lamp serving as a tail lamp when only the light source 41 is caused to emit light, i.e., the light having a low luminous intensity, and serving as a stop lamp when both the light source 41 and the reflector 244 are caused to emit light, i.e., the light having a high luminous intensity. Alternatively, the vehicle lamp may be configured to serve as a tail lamp when only the reflector 244 is caused to emit light and to serve as a stop lamp when both the light source 41 and the reflector 244 are caused to emit light. Further, for example, in a case in which the light source 41 and the reflector 244 are configured to emit light of different colors, it is possible to selectively emit light in three colors, i.e., by causing only the light source 41 to emit light, only the reflector 244 to emit light, or both the light source 41 and the reflector 244 to emit light.

While the present invention has been described with reference to certain embodiments, they are merely exemplary embodiments, and those skilled in the art having benefit of this disclosure will appreciate that various changes and modifications can be made therein without departing from the present invention as defined by the appended claims. Aspects of one or more embodiments described above and aspects of one or more modifications described below may be combined to implement the present invention with respective advantages of the combined aspects.

The surface light-emitting devices are not limited to the organic EL devices described above, and may be, for example, inorganic EL devices.

The shape of the base of the light source is not limited to a rectangular column, and may be a different shape, for example, a polygonal column other than the rectangular column, a polygonal pyramid, a truncated polygonal pyramid, a cylindrical column, a cone, or a truncated cone. According to this modification, it is possible to form various patterns as desired.

The configuration of the light source is not limited to a configuration in which four surface light-emitting devices, each prepared in a from of a substantially rectangular sheet, are firmly attached to the respective four side surfaces of the base. The number of the surface light-emitting devices may be one, two or three, or five or more. Further, the surface light-emitting device may be prepared to have a shape other than a rectangular shape, e.g., a shape representing figures, characters, symbols or the like. Each surface light-emitting device may have different shape. Further, the surface light-emitting devices may be arranged at optional positions. According to such modifications, it is possible to form various patterns as desired.

Figure 6:
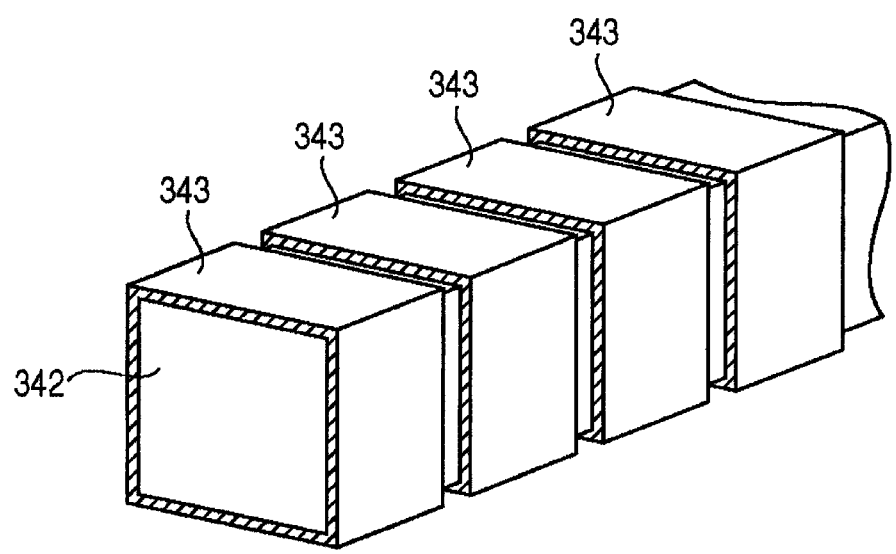
FIG. 6 is a perspective view of a light source of a vehicle lamp according to one ore more embodiments of the present invention.

Hereinafter, an example in which an arrangement of the surface light-emitting devices is changed will be described. FIG. 6 is a perspective view of a light source 341 of a vehicle lamp according to a modified example. FIG. 6 corresponds to FIG. 3. The light source 341 includes a base 342 and four surface light-emitting devices 343. Like the surface light-emitting devices 43, each surface light-emitting device 343 is an organic EL device, and is configured in a form a substantially rectangular sheet. Each surface light-emitting device 343 is firmly attached to side surfaces of the base 342 so as to surround the base 342 in a circumferential direction of the base 342. The surface light-emitting devices 343 are arranged side by side in a longitudinal direction of the base 342 in which the base 342 extends, with a gap provided between adjacent surface light-emitting devices 343. As a result, three square ring-shaped gaps, not covered by the surface light-emitting devices 343, are provided side by side in the extending direction of the base 342. Like the surface light-emitting devices 43, each surface light-emitting device 343 is configured to emit red light.

Figure 7:
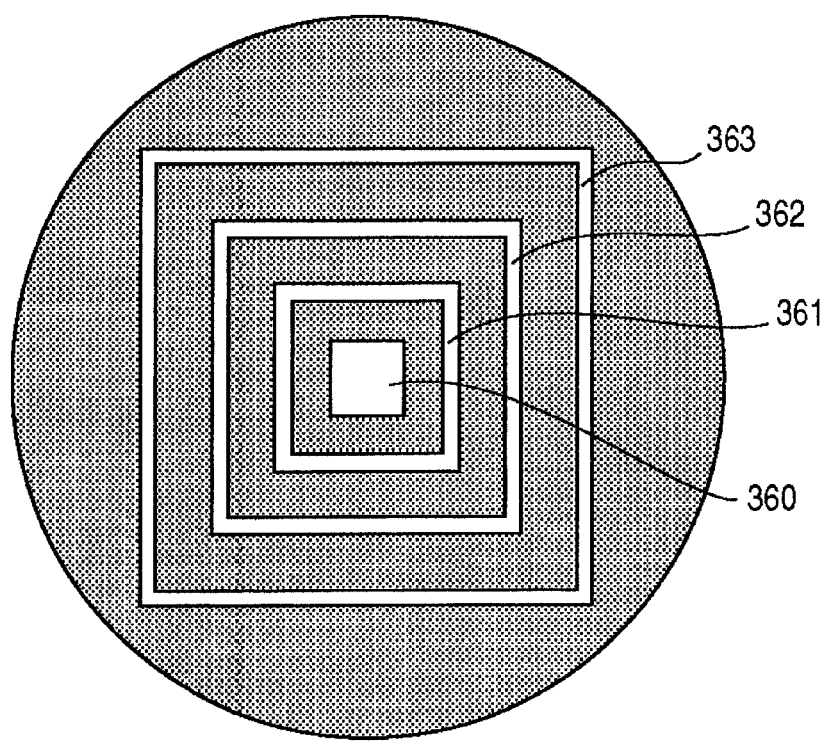

FIG. 7 illustrates a pattern projected on the reflector 44 when the light source 341 is turned on. FIG. 7 corresponds to FIG. 4. As shown in FIG. 7, a region 360 corresponding to an end surface of the light source 341 and regions 361, 362, 363 corresponding to the square ring-shaped gap portions of the side surfaces of the light source 341, not covered by the surface light-emitting devices 343, provide a dark appearance as the light is not projected on these regions.

As a result, a concentric pattern is presented by the regions have red light-emitting appearance.

While one or more of the foregoing embodiments have been described to have four surface light-emitting devices that are each configured to emit red light, the surface light-emitting devices may be configured to emit light in different colors respectively, so as to provide a lamp having a desired light-emitting appearance by the difference in color of light, in addition to the contrast of light. It is also possible to implement a lamp having multiple functions.

As an example, one or more of the embodiments of FIG. 1 to FIG. 3 may be modified such that the surface light-emitting device 43U and the surface light-emitting device 43D are configured to emit red light and the surface light-emitting device 43L and the surface light-emitting device 43R are configured to emit amber light. With this configuration, in FIG. 4, the region 65 and the region 67 provide red light-emitting appearance, and the region 66 and the region 68 provide amber light-emitting appearance. As a result, it is possible to provide a vehicle lamp having two functions. Specifically, the vehicle lamp has a function as a tail lamp by causing the surface light-emitting device 43U and the surface light-emitting device 43D to emit light and a function as a turn signal lamp by causing the surface light-emitting device 43L and the surface light-emitting device 43R to emit light.

While one or more of the foregoing embodiments have been described to have surface light-emitting devices that are each configured to emit red light, i.e., to emit light in a single color, each surface light-emitting device may be configured to emit light in multiple colors selectively. With this configuration, it is possible to provide a lamp having a desired light-emitting appearance by the difference in color of light, in addition to the contrast of light. It is also possible to provide a lamp having a light-emitting appearance with colors changing with time.

Figure 8:
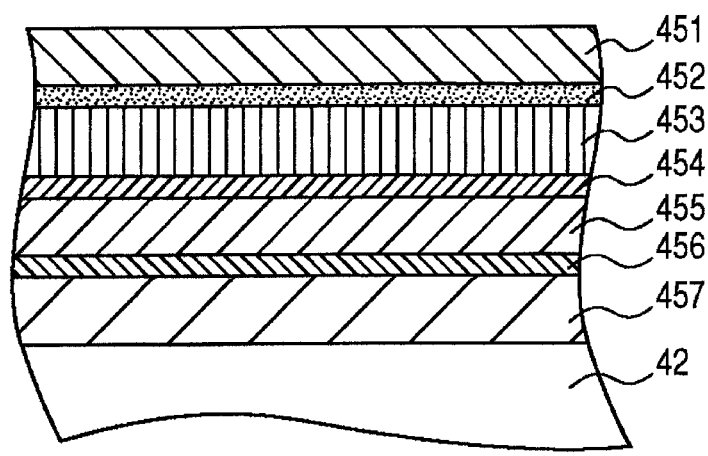
FIG. 8 is a schematic diagram illustrating a surface light-emitting device configured to emit light in multiple colors selectively.

As an example, one or more of the embodiments of FIG. 1 to FIG. 3 may be configured such that the surface light-emitting device 43L and the surface light-emitting device 43R are each configured to selectively emit red light or amber light. Here, FIG. 8 is a schematic view for illustrating a surface light-emitting device that can selectively emit light in multiple colors. The surface light-emitting device includes a first substrate 451, a first transparent electrode 452, a first organic light-emitting layer 453, a second transparent electrode 454, a second organic light-emitting layer 455, a back electrode 456, and a second substrate 457. The first organic light-emitting layer 453 is configured to emit red light, and the second organic light-emitting layer 455 is configured to emit green light. When voltage is applied between the first transparent electrode 452 and the second transparent electrode 454, the first organic light-emitting layer 453 emits light, i.e., the surface light-emitting device as a whole emits red light. When voltage is applied between the first transparent electrode 452 and the back electrode 456, the first organic light-emitting layer 453 and the second organic light-emitting layer 455 emit light, i.e., the surface light-emitting device as a whole emits light in a mixed color (amber) of a red and green. In this way, the surface light-emitting device can selectively emit either red light or amber light. By arranging the first organic light-emitting layer 453 emitting red light on a side farther from the base 42 (closer to the reflector 44) and than the second organic light-emitting layer 455 emitting green light, it is possible to suppress green light, which is undesirable under the regulations, from being irradiated to the outside of the lamp.

By configuring the surface light-emitting device 43L and the surface light-emitting device 43R in a manner described above, it is possible to provide a lamp serving as a tail lamp when all of four of surface light-emitting devices 43 are caused to emit red light and also serving as a turn signal lamp when the surface light-emitting device 43U and the surface light-emitting device 43D are caused to emit red light and the surface light-emitting device 43L and the surface light-emitting device 43R are caused to emit amber light.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle lamp comprising:
a light source; and
an optical member that reflects light from the light source, wherein the light source comprises:
   a base extending in a front-rear direction of the vehicle lamp, and
   a plurality of surface light-emitting devices, each of which is provided on side surfaces of the base so as to continuously surround the base in a circumferential direction of the base,
wherein the base comprises a light-emitting portion covered by the surface light-emitting devices and a non-light-emitting portion not covered by the surface light-emitting devices, and
wherein each of the surface light-emitting devices is an organic electro-luminescence device,
wherein the light-emitting portion and the non-light-emitting portion are structured to project a pattern on the optical member, and
wherein the surface light-emitting devices are arranged side by side in a longitudinal direction of the base in which the base extends, with a gap provided between adjacent surface light-emitting devices.

2. The vehicle lamp according to claim 1, wherein the base has a polygonal columnar shape.

3. The vehicle lamp according to claim 1, wherein the surface light-emitting devices comprise a first surface light-emitting device and a second surface light-emitting device.

4. The vehicle lamp according to claim 3, wherein the first surface light-emitting device and the second surface light-emitting device emit the light in different colors.

5. The vehicle lamp according to claim 1, wherein the optical member comprises a surface light-emitting and reflecting device that emits light and that comprises a reflecting surface that reflects the light from the light source.

6. The vehicle lamp according to claim 5, wherein the surface light-emitting and reflecting device emits the light of a color different from the light from the light source.

7. The vehicle lamp according to claim 1, wherein the surface light-emitting device emits the light in multiple colors selectively.

8. The vehicle lamp according to claim 7, wherein each of the surface light-emitting devices is an organic electro-luminescence device having a plurality of organic light-emitting layers that emits the light in different colors.

9. The vehicle lamp according to claim 1, wherein, in a front view of the vehicle lamp, the pattern includes a first region having a light-emitting appearance by a reflection of the light from the surface light-emitting devices, and a second region darker than the first region and corresponding to a portion of a side surface of the base not covered by the surface light-emitting devices.

10. The vehicle lamp according to claim 6, wherein the vehicle lamp is configured to selectively emit light in three colors by causing only the light source to emit light, only the surface light-emitting and reflecting device to emit light, or both the light source and the surface light-emitting and reflecting device to emit light.

* * * * *